US010100738B2

(12) United States Patent
Hill et al.

(10) Patent No.: US 10,100,738 B2
(45) Date of Patent: Oct. 16, 2018

(54) OVERCOOLED AIR COOLING SYSTEM WITH ANNULAR MIXING PASSAGE

(71) Applicant: United Technologies Corporation, Hartford, CT (US)

(72) Inventors: James D. Hill, Tolland, CT (US); William K. Ackermann, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 407 days.

(21) Appl. No.: 14/600,862

(22) Filed: Jan. 20, 2015

(65) Prior Publication Data

US 2016/0208703 A1    Jul. 21, 2016

(51) Int. Cl.
*F02C 7/18* (2006.01)
*F02C 3/04* (2006.01)
(Continued)

(52) U.S. Cl.
CPC ............. *F02C 7/18* (2013.01); *F01D 5/082* (2013.01); *F01D 25/12* (2013.01); *F02C 3/04* (2013.01); *F02C 6/06* (2013.01); *F02C 7/185* (2013.01); *F02K 3/115* (2013.01); *F01D 5/081* (2013.01); *F01D 9/02* (2013.01); *F02C 6/08* (2013.01); *F02C 7/12* (2013.01); *F02C 9/18* (2013.01);
(Continued)

(58) Field of Classification Search
CPC .... F23R 3/04; F23R 3/045; F01D 9/02; F01D 5/081; F01D 5/082; F02C 7/12; F02C 7/18; F02C 7/185; F02C 6/08; F02C 9/18; F05D 2260/213
See application file for complete search history.

(56) References Cited

U.S. PATENT DOCUMENTS

| | | |
|---|---|---|
| 6,612,114 B1 | 9/2003 | Klingels |
| 8,182,205 B2 * | 5/2012 | Caruso .................... F01D 9/065 |
| | | 415/116 |

(Continued)

FOREIGN PATENT DOCUMENTS

EP    0203431    12/1986

OTHER PUBLICATIONS

Extended European Search Report dated Jun. 15, 2016 in European Application No. 16151950.9.

(Continued)

*Primary Examiner* — Craig Kim
*Assistant Examiner* — Katheryn Malatek
(74) *Attorney, Agent, or Firm* — Snell & Wilmer L.L.P.

(57) ABSTRACT

A cooling system is provided. The cooling system may comprise a heat exchanger and a first conduit fluidly coupled to an outlet of the heat exchanger. An annular passage may be fluidly coupled to the first conduit. A tangential onboard injector (TOBI) may be fluidly coupled to the annular passage. A gas turbine engine is also provided and may comprise a compressor, a combustor in fluid communication with the compressor, and a diffuser around the combustor and a turbine. A heat exchanger may have an inlet fluidly coupled to the diffuser. A second conduit may be fluidly coupled to an outlet of the heat exchanger. An annular passage may be fluidly coupled to the second conduit. A tangential onboard injector (TOBI) may be fluidly coupled to the annular passage.

15 Claims, 4 Drawing Sheets

(51) Int. Cl.
*F01D 25/12*      (2006.01)
*F02K 3/115*      (2006.01)
*F02C 6/06*       (2006.01)
F23R 3/04         (2006.01)
F02C 6/08         (2006.01)
F01D 9/02         (2006.01)
F02C 9/18         (2006.01)
F02C 7/12         (2006.01)
F01D 5/08         (2006.01)

(52) U.S. Cl.
CPC .. *F05D 2260/209* (2013.01); *F05D 2260/211* (2013.01); *F05D 2260/213* (2013.01); *F05D 2300/175* (2013.01); *F23R 3/04* (2013.01); *F23R 3/045* (2013.01); *Y02T 50/676* (2013.01)

(56) References Cited

U.S. PATENT DOCUMENTS

| | | | |
|---|---|---|---|
| 2011/0088405 A1* | 4/2011 | Turco | F01D 5/081 |
| | | | 60/782 |
| 2013/0078080 A1 | 3/2013 | Durocher et al. | |
| 2013/0236299 A1* | 9/2013 | Kington | F02C 7/10 |
| | | | 415/177 |
| 2013/0255275 A1 | 10/2013 | Schwarz et al. | |

OTHER PUBLICATIONS

European Patent Office, European Office Action dated Feb. 20, 2018 in Application No. 16 151 950.9-1007.

* cited by examiner

OVERCOOLED AIR COOLING SYSTEM WITH ANNULAR MIXING PASSAGE

FIELD OF INVENTION

The present disclosure relates to gas turbine engines, and, more specifically, to an efficient cooling system including an annular passage and insulated tube.

BACKGROUND

Gas turbine engines often operate at high temperatures. Combustors and turbines in particular may be exposed to exceedingly harsh environments. As engine efficiency and power increases, internal temperatures continue to rise. As a result, gas turbine engines depend on cooling to protect components and ensure longevity. Cooling, however, often relies on gas extracted from the gas path that would otherwise translate to thrust. Thus, providing cooling while minimizing the use of compressed gas may increase engine efficiency.

SUMMARY

A cooling system comprises a heat exchanger, a first conduit fluidly coupled to an inlet of the heat exchanger, and a second conduit fluidly coupled to an outlet of the heat exchanger. An annular passage may be fluidly coupled to the second conduit. A tangential onboard injector (TOBI) may be fluidly coupled to the annular passage.

In various embodiments, the second conduit may comprise a tube having a double walled architecture. Mixing openings may be defined by a distal surface of the annular passage. A diffuser may have a proximal boundary at least partially defined by the distal surface of the annular passage. A first conduit may be fluidly coupled to the diffuser and an inlet of the heat exchanger. The first conduit may be configured to extract 0.5 to 20 percent of air available in the diffuser. The second conduit may be longer than the first conduit.

A gas turbine engine comprises a compressor, a combustor in fluid communication with the compressor, a turbine in fluid communication with the combustor, and a diffuser around the combustor. A first conduit may be fluidly coupled to the diffuser, and a heat exchanger may comprise an inlet fluidly coupled to the first conduit. A second conduit may be fluidly coupled to an outlet of the heat exchanger. An annular passage may be fluidly coupled to the second conduit, and a tangential onboard injector (TOBI) may be fluidly coupled to the annular passage.

In various embodiments, the second conduit comprises a tube having a double walled architecture. Mixing openings may be defined by a distal surface of the annular passage. The distal surface of the annular passage may at least partially define a boundary of the diffuser. The first conduit may be configured to extract 0.5 to 20 percent of air available in the diffuser. The second conduit may be longer than the first conduit.

A diffuser case may comprise a first conduit configured to extract gas from the diffuser case. A second conduit may be in fluid communication with the first conduit and include a double walled architecture. The second conduit may also extend through the diffuser case. An annular passage may at least partially define a proximal boundary of the diffuser case. The annular passage may be in fluid communication with the second conduit.

In various embodiments, the first conduit may be configured to extract 0.5 to 20 percent of air available in the diffuser case. The first conduit may be longer than the second conduit. Mixing openings may be defined by a wall of the annular passage. The annular passage may be configured to operate as an ejector with the mixing openings. The second conduit may comprise a nickel-based superalloy.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
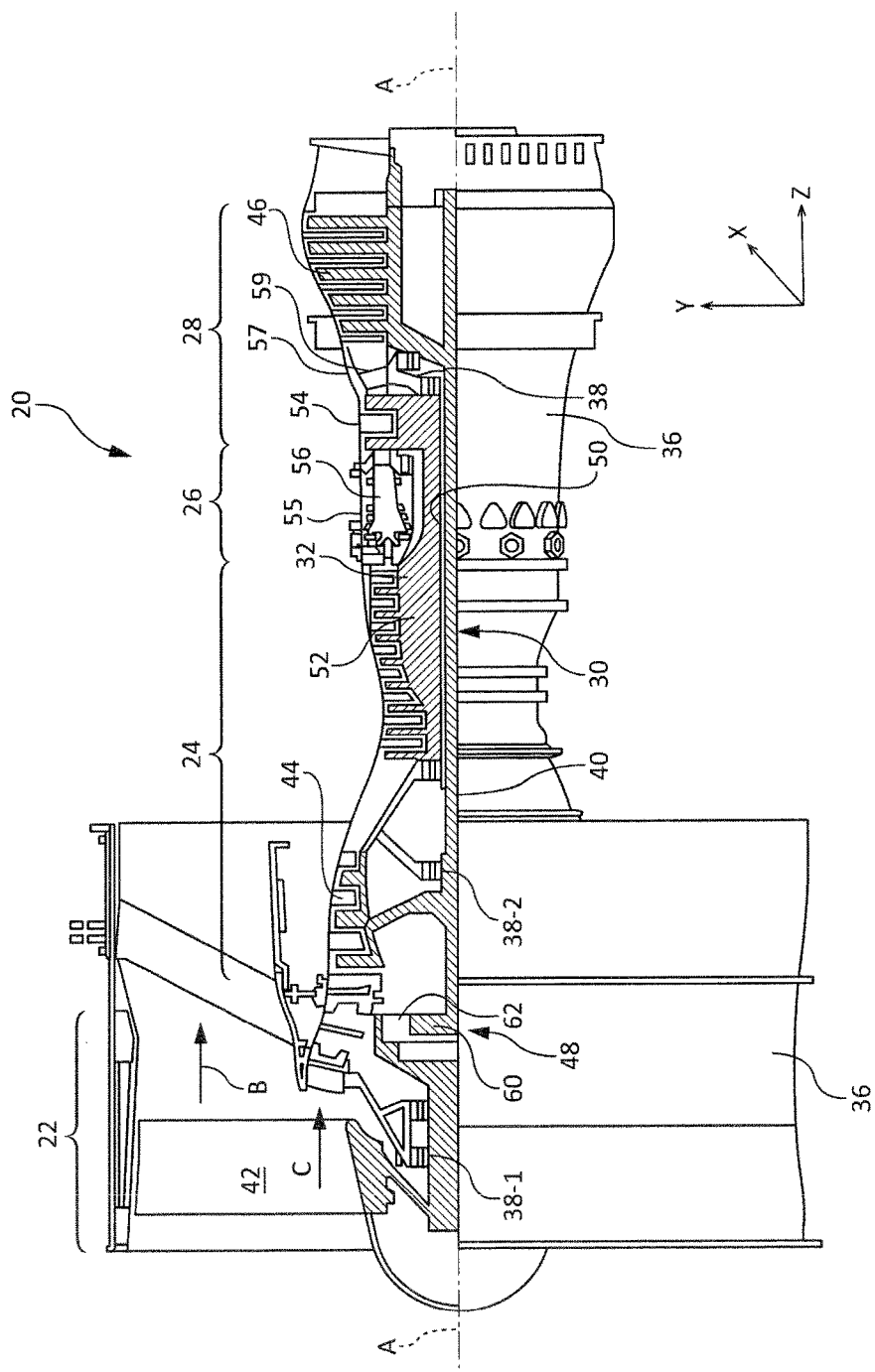
FIG. 1 illustrates an exemplary gas-turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. Diffuser case 55 may be disposed around combustor 56. An air cooling system may extract air from diffuser case 55 and deliver the air to cool disks in high pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
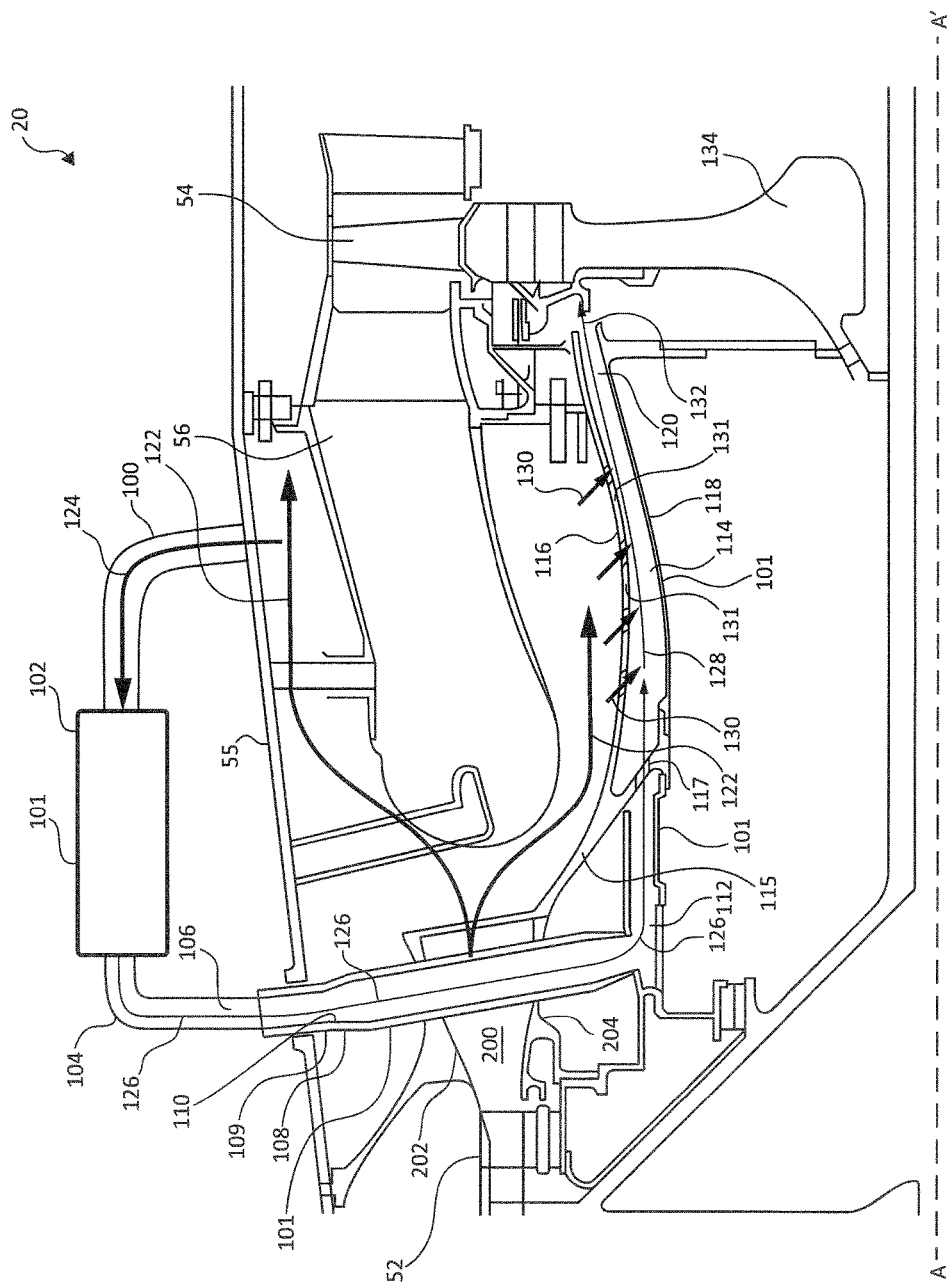
FIG. 2 illustrates a system for cooling turbine disks using overcooled gasses and a tangential onboard injector (TOBI), in accordance with various embodiments.

With reference to FIG. 2, a cooling system 101 for use with a diffuser case 55 according to various embodiments. Diffuser case 55 surrounds an annular diffuser 200, the annular diffuser 200 comprising an outboard wall 202 and an inboard wall 204. A conduit 100 is configured to extract air or other coolant from diffuser case 55, which has an annular shape. Conduit 100 may be configured to extract 0.5 to 20 percent of air available in the diffuser, for example. Cooling system 101 also comprises a heat exchanger 102 with an inlet fluidly and mechanically coupled to conduit 100. An outlet of heat exchanger 102 may be fluidly and mechanically coupled to conduit 104. Conduit 104 may in turn be fluidly and mechanically coupled to conduit 108. Conduit 108 may comprise a double walled architecture to improve insulation characteristics, with outer wall 109 disposed around inner wall 110. In various embodiments, conduit 108 may be disposed within a strut providing support to bearings and static structures within gas turbine engine 20. Conduit 108 may extend to jumper tube 112. Jumper tube 112 may be a conduit to guide coolant (i.e., air) through the cooling system without exposing the coolant directly to the hot air in diffuser case 55. Jumper tube 112 may then extend axially (i.e., along the engine central longitudinal axis A-A') towards annular passage 114. Jumper tube 112 may be mechanically and fluidly coupled with annular passage 114. Annular passage 114 may be defined by distal wall 116 and proximal wall 118. Annular passage 114 is further coupled to Tangential Onboard Injector (TOBI) 120.

In various embodiments, cooling system 101 may extract air 122 from diffuser case 55, cool the extracted air, and deliver the cooled air to a turbine rotor for cooling purposes. Internal air 124 available at the surface of diffuser case 55 may be extracted via conduit 100. Internal air 124 available at diffuser case 55 may be approximately 1,500° F. (816° C.). Conduit 100 may deliver the hot air extracted from diffuser case 55 into an inlet of heat exchanger 102. Heat exchanger 102 may be placed in cooler air stream, for example, air from fan 42. As a result, heat exchanger 102 may reduce the temperature of air to as low as approximately 450° F. (232° C.). Cooled air 126 may exit through an outlet of heat exchanger 102 via conduit 104 and be delivered into conduit 108.

In various embodiments, heat exchanger 102 may be an air to air heat exchanger. Conduit 108 may transport cooled air 126 to jumper tube 112. While in conduit 108, cooled air 126 passes through diffuser case 55 with limited heating due to the dual walled architecture of conduit 108. The cooled air then passes through jumper tube 112 and passes through opening 117 through wall 115 and into annular passage 114. Annular passage 114 may act as a mixing plenum for cooled air 126 and air 122 available in diffuser case 55 to produce mixed air 128. Annular passage 114 acts as an ejector with mixing openings 131 and provides mixed air 128 to TOBI 120. TOBI 120 then accelerates mixed air 128 and expels mixed air 128 towards disk 134 to cool disk 134.

Figure 3:
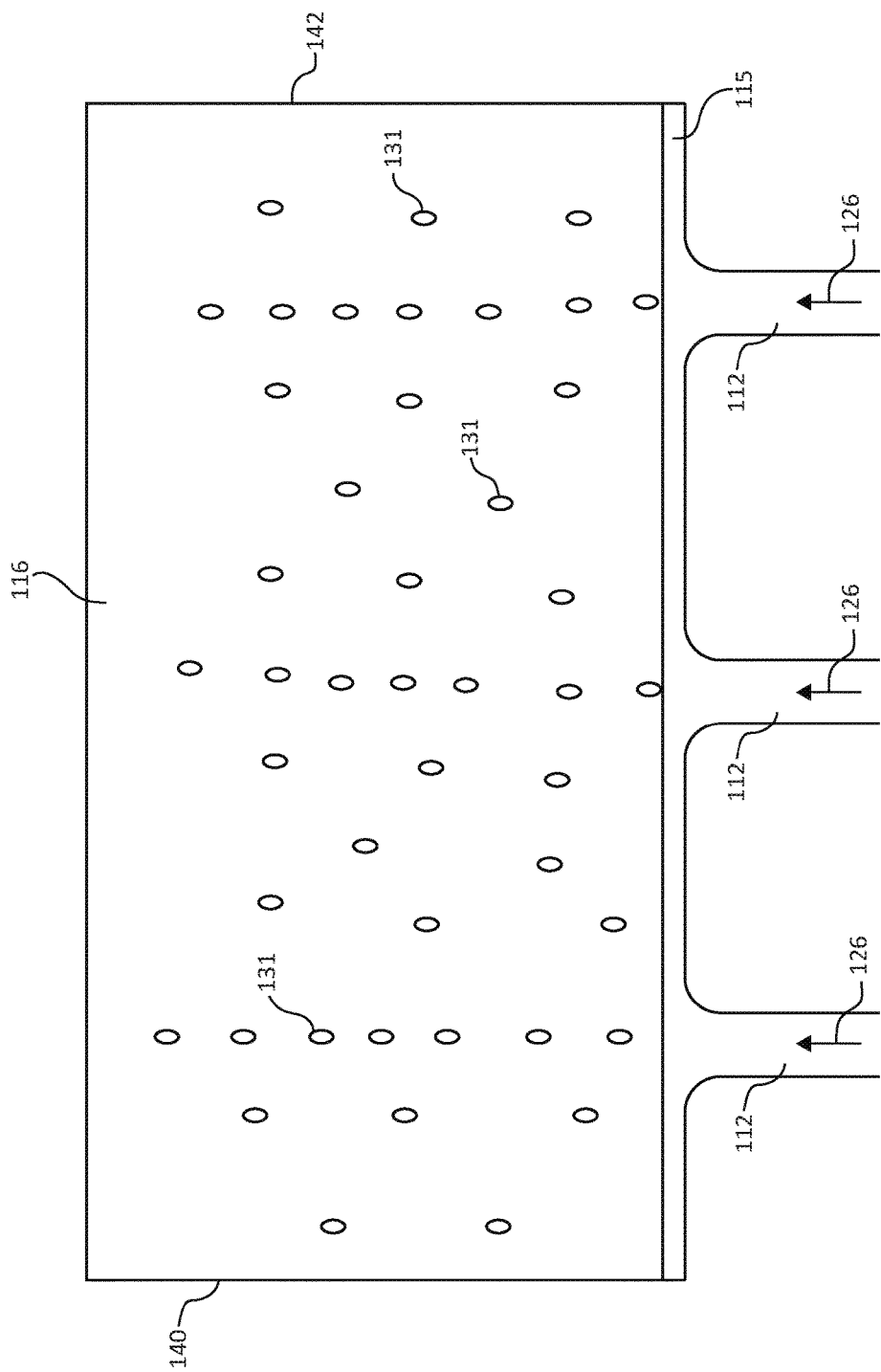
FIG. 3 illustrates a wall of an annular mixing passage flattened with mixing openings defined by the wall, in accordance with various embodiments.
Figure 4:
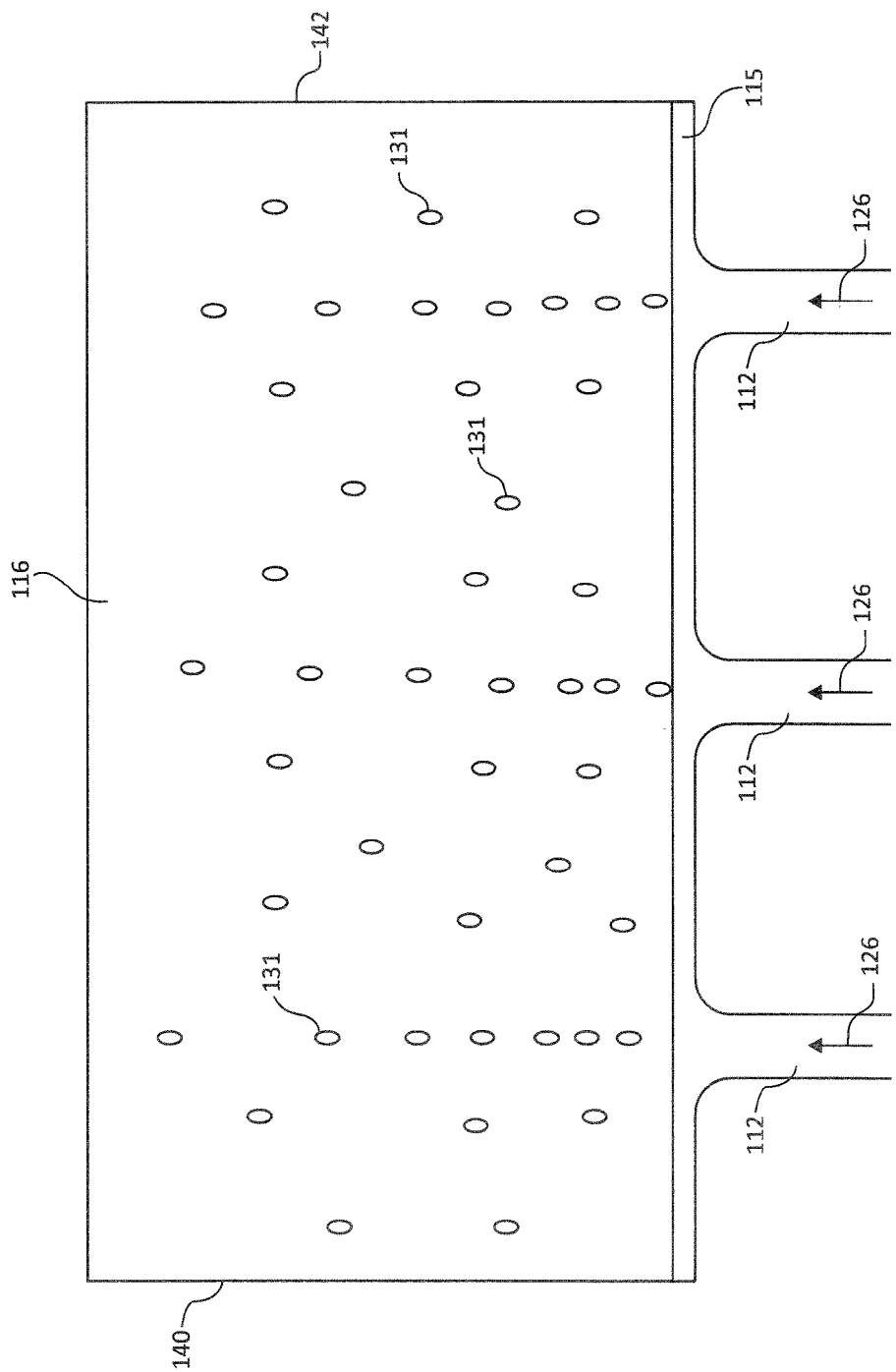
FIG. 4 illustrates a wall of an annular mixing passage flattened with mixing openings defined by the wall, in accordance with various embodiments.

With reference to FIG. 3 and FIG. 4, a distal wall 116 of annular passage 114 of FIG. 2 is shown flattened out to illustrate mixing openings 131 and jumper tube 112, in accordance with various embodiments. Distal wall 116 may be configured in an annular geometry with side 140 and side 142 joining. Distal wall 116 may meet a plurality of jumper tubes 112 to deliver cooled air 126 into annular passage 114 (of FIG. 2). In various embodiments, two to ten jumper tubes 112 may deliver cooled air 126 to distal wall 116. Distal wall 116 may also comprise mixing holes 132. Mixing openings 131 may be more concentrated near jumper tubes 112 and less concentrated further from jumper tubes 112. The concentrations of mixing openings 131 may be optimized during testing to provide well mixed air to TOBI 120 for cooling. Referring back to FIG. 2, cooling system 101 may enable efficient cooling of disk 134 by decreasing the temperature of the air needed to cool the disk 134. This decreases the amount of air needed for cooling and increases the amount of air available to perform work in the engine. Cooling system 101 minimizes heat transfer into cooled air as cooled air passes through the diffuser case. As a result, cooling system 101 may increase engine efficiency by limiting air extracted from the gas path.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooling system, comprising:
   a heat exchanger;
   a first conduit fluidly coupled to an inlet of the heat exchanger and configured to extract internal air from a diffuser case disposed about an annular diffuser and a combustor;
   a second conduit fluidly coupled to an outlet of the heat exchanger;
   a third conduit, wherein the third conduit comprises a double walled tube extending radially inward of the diffuser case into an interior volume of the diffuser case, the double walled tube spanning an entirety of a distance from a radially outward portion of the diffuser case to a radially inward portion of the diffuser case, the double walled tube passing through an outboard wall and an inboard wall of the annular diffuser, wherein a portion of the double walled tube extends radially outward of the diffuser case, wherein the portion of the double walled tube is coupled to and in fluid communication with the second conduit at a proximate end of the third conduit;
   an annular passage fluidly coupled to the third conduit at a distal end of the third conduit;
   a tangential onboard injector (TOBI) fluidly coupled to the annular passage; and
   mixing openings defined by a distal surface of the annular passage,
   wherein the diffuser case has a proximal boundary at least partially defined by the distal surface of the annular passage and further characterized in that the distal surface meets a plurality of jumper tubes configured to deliver cooled air, and
   wherein at least one of:
   the mixing openings are more densely packed near exits of the plurality of jumper tubes than downstream of the exits of the plurality of jumper tubes, or
   the mixing openings are more densely packed at first circumferential locations which coincide with the plurality of jumper tubes than at second circumferential locations which do not coincide with the plurality of jumper tubes.

2. The cooling system of claim 1, wherein the TOBI is configured to direct the cooled air to impinge upon a component of a turbine disk of a gas turbine engine.

3. The cooling system of claim 1, wherein the first conduit is fluidly coupled to the diffuser case.

4. The cooling system of claim 3, wherein the first conduit is configured to extract 0.5 to 20 percent of the internal air available in the diffuser case.

5. The cooling system of claim 3, wherein the coupled second conduit and third conduit is longer than the first conduit.

6. A gas turbine engine, comprising:
a compressor;
a combustor in fluid communication with the compressor;
a turbine in fluid communication with the combustor;
a diffuser case around an annular diffuser and the combustor;
a first conduit fluidly coupled to the diffuser case;
a heat exchanger comprising an inlet fluidly coupled to the first conduit;
a second conduit fluidly coupled to an outlet of the heat exchanger;
a third conduit, wherein the third conduit comprises a double walled tube extending radially inward of the diffuser case into an interior volume of the diffuser case, the double walled tube spanning an entirety of a distance from a radially outward portion of the diffuser case to a radially inward portion of the diffuser case, the double walled tube passing through an outboard wall and an inboard wall of the annular diffuser, wherein a portion of the double walled tube extends radially outward of the diffuser case, wherein the portion of the double walled tube is coupled to and in fluid communication with the second conduit at a proximate end of the third conduit;
an annular passage fluidly coupled to the third conduit at a distal end of the third conduit;
a tangential onboard injector (TOBI) fluidly coupled to the annular passage; and
mixing openings defined by a distal surface of the annular passage,
wherein the distal surface of the annular passage at least partially defines a boundary of the diffuser case and further characterized in that the distal surface meets a plurality of jumper tubes configured to deliver cooled air, and
wherein at least one of:
the mixing openings are more densely packed near exits of the plurality of jumper tubes than downstream of the exits of the plurality of jumper tubes, or
the mixing openings are more densely packed at first circumferential locations which coincide with the plurality of jumper tubes than at second circumferential locations which do not coincide with the plurality of jumper tubes.

7. The gas turbine engine of claim 6, wherein the TOBI is configured to direct the cooled air to impinge upon a component of a turbine disk of the gas turbine engine.

8. The gas turbine engine of claim 6, wherein the first conduit is configured to extract internal air from the diffuser case.

9. The gas turbine engine of claim 8, wherein the first conduit is configured to extract 0.5 to 20 percent of the internal air available in the diffuser case.

10. The gas turbine engine of claim 8, wherein the coupled second and third conduit is longer than the first conduit.

11. A cooling system, comprising:
a diffuser case about an annular diffuser;
a first conduit configured to extract internal air from the diffuser case;
a second conduit in fluid communication with the first conduit;
a third conduit comprising a double walled tube extending radially inward of the diffuser case into an interior volume of the diffuser case spanning an entirety of a distance from a radially outward portion of the diffuser case to a radially inward portion of the diffuser case, wherein the third conduit extends through the diffuser case, the double walled tube passing through an outboard wall and an inboard wall of the annular diffuser, wherein a portion of the double walled tube extends radially outward of the diffuser case, wherein the portion of the double walled tube is coupled to and in fluid communication with the second conduit at a proximate end of the third conduit;
an annular passage at least partially defining a proximal boundary of the diffuser case, the annular passage in fluid communication with the third conduit; and
mixing openings defined by a wall of the annular passage and further characterized in that the wall of the annular passage meets a plurality of jumper tubes configured to deliver cooled air, and
wherein at least one of:
the mixing openings are more densely packed near exits of the plurality of jumper tubes than downstream of the exits of the plurality of jumper tubes, or
the mixing openings are more densely packed at first circumferential locations which coincide with the plurality of jumper tubes than at second circumferential locations which do not coincide with the plurality of jumper tubes.

12. The cooling system of claim 11, wherein the first conduit is configured to extract 0.5 to 20 percent of the internal air available in the diffuser case.

13. The cooling system of claim 11, wherein the coupled second and third conduit is longer than the first conduit.

14. The cooling system of claim 11, wherein the annular passage is configured to operate as an ejector with the mixing openings, wherein a tangential onboard injector (TOBI) is fluidly coupled to the annular passage and the TOBI is configured to direct the cooled air to impinge upon a component of a turbine disk of a gas turbine engine.

15. The cooling system of claim 11, wherein the second conduit comprises a nickel-based superalloy.

* * * * *